(12) United States Patent
Kim et al.

(10) Patent No.: US 11,555,542 B2
(45) Date of Patent: Jan. 17, 2023

(54) TRANSMISSION FOR VEHICLE (71) Applicant: SL Corporation, Gyeongsangbuk-do (KR)

(72) Inventors: Sungjin Kim, Gyeongsangbuk-do (KR); Minsoo Kim, Gyeongsangbuk-do (KR); Jaeseung Hong, Gyeongsangbuk-do (KR); Mirae Do, Gyeongsangbuk-do (KR)

(73) Assignee: SL Corporation, Daegu (KR)

( * ) Notice: Subject to any disclaimer, the term of this patent is extended or adjusted under 35 U.S.C. 154(b) by 227 days.

(21) Appl. No.: 16/916,985

(22) Filed: Jun. 30, 2020

(65) Prior Publication Data
US 2021/0071754 A1  Mar. 11, 2021

(30) Foreign Application Priority Data

Sep. 9, 2019  (KR) .......................... 10-2019-0111580

(51) Int. Cl.
*F16H 59/04* (2006.01)
*F16H 59/10* (2006.01)
(Continued)

(52) U.S. Cl.
CPC ......... *F16H 59/044* (2013.01); *F16H 59/105* (2013.01); *F16H 2059/0221* (2013.01); *F16H 2059/081* (2013.01)

(58) Field of Classification Search
CPC ............. F16H 2059/081; F16H 59/044; F16H 59/105; F16H 2059/0221; F16H 61/24; F16H 2061/241; H01F 5/00
See application file for complete search history.

(56) References Cited

U.S. PATENT DOCUMENTS 4,537,001 A * 8/1985 Uppstrom ............... B44C 3/123
                                                      D25/138
9,970,538 B2 * 5/2018 Chen ....................... G05G 5/06
(Continued)

FOREIGN PATENT DOCUMENTS

CN    101341357 A    1/2009
CN    107196484 A    9/2017
(Continued)

OTHER PUBLICATIONS

Electronics Tutorials, "The Electromagnet", printed Apr. 2022, https://www.electronics-tutorials.ws/electromagnetism/electromagnets.html (Year: 2022).*

*Primary Examiner* — William C Joyce
*Assistant Examiner* — Gregory Robert Weber
(74) *Attorney, Agent, or Firm* — United One Law Group LLC; Kongsik Kim; Jhongwoo Peck (57) ABSTRACT

A transmission for a vehicle includes a knob configured to be rotated to select one of a plurality of shift stages, a driving unit for controlling rotation of the knob, and a shift controller for applying an electrical current to generate a torque in the driving unit. Further, the driving unit includes a magnetic field generator, a magnetization unit including a plurality of magnetic bodies arranged at regular intervals along a circumference of the magnetic field generator, and a magnet unit including at least one pair of magnetic poles arranged along a circumference of the magnetization unit. In particular, the magnetization unit or the magnet unit is coupled with the knob and rotates integrally with the knob. Depending on an intensity of a magnetic field generated by the magnetic field generator, the driving unit allows or prevents the rotation of the knob.

18 Claims, 10 Drawing Sheets

(51) Int. Cl.
 *F16H 59/08* (2006.01)
 *F16H 59/02* (2006.01)

(56) References Cited

U.S. PATENT DOCUMENTS

| | | | |
|---|---|---|---|
| 10,845,840 B2* | 11/2020 | Goto | F16F 9/535 |
| 10,948,031 B2* | 3/2021 | Battlogg | F16C 41/001 |
| 2008/0143210 A1* | 6/2008 | Wang | H02K 1/165 |
| | | | 310/44 |
| 2011/0110800 A1* | 5/2011 | Lai | H02K 3/47 |
| | | | 310/156.32 |
| 2018/0038478 A1* | 2/2018 | Arakawa | F16H 59/08 |
| 2018/0239385 A1* | 8/2018 | Mizukami | H03K 17/97 |
| 2018/0363769 A1* | 12/2018 | Nilsson | F16H 61/24 |
| 2019/0165715 A1* | 5/2019 | Hoshino | H02M 7/48 |
| 2019/0203832 A1* | 7/2019 | Heo | F16H 61/24 |

FOREIGN PATENT DOCUMENTS

| | | | |
|---|---|---|---|
| CN | 109995217 A | 7/2019 | |
| EP | 2 159 455 A1 | 3/2010 | |
| KR | 10-2015-0112292 A | 10/2015 | |
| KR | 10-2017-0080081 A | 7/2017 | |
| KR | 10-2019-0081979 A | 7/2019 | |
| WO | WO-2017140366 A1 * | 8/2017 | F16H 61/22 |

\* cited by examiner

TRANSMISSION FOR VEHICLE

CROSS-REFERENCE TO RELATED APPLICATION

This application claims priority from Korean Patent Application No. 10-2019-0111580 filed on Sep. 9, 2019, the contents of which in their entirety are herein incorporated by reference.

BACKGROUND

1. Technical Field

The present disclosure relates to a transmission for a vehicle, and more particularly, to a transmission for a vehicle that enables shift control by changing a magnetic field.

2. Description of the Related Art

Generally, a transmission for a vehicle varies gear ratios to maintain a particular rotational speed of an engine based on a speed of the vehicle. A driver operates a shift lever on the transmission to adjust the gear ratio of the transmission.

A shift mode of the transmission includes a manual shift mode in which the driver adjusts a gear ratio and an automatic shift mode in which the gear ratio is automatically adjusted based on the speed of the vehicle when the driver selects a driving stage D. In addition, a sports mode type transmission capable of performing manual shift and automatic shift in a single transmission is used. The sport mode type transmission can primarily perform automatic shift, while allowing the driver to perform manual shift by increasing or decreasing the gear stage.

Such a transmission has a function of inducing an appropriate shift operation of the driver while providing a feeling of operation when the driver operates the shift lever, or a shift lock function that enables the shift lever to shift from the current position to another position only when a specific condition is satisfied.

The feeling of operation provided when the driver operates the shift lever is generated when the position of a bullet is changed due to the operation of the shift lever and moves along a contact surface of a detent groove. In particular, the feeling of operation depends on a profile of the contact surface of the detent groove.

Further, the shift lock function generally has a primary shift lock function that prevents the shift lever from rotating to another position unless a brake pedal is pressed while a shift stage is in a Parking P or Neutral N stage, and a secondary shift lock function that prevents the shift lever from rotating to a Reverse R stage when the vehicle is operating at a certain speed or higher. In addition, a full shift lock function capable of locking all shift stages is also implemented in order to prevent the driver from erroneously operating the transmission.

The feeling of operation and the shift lock function may be achieved by the interaction between components such as the bullet, the detent groove, and a plurality of gears that are in physical contact with each other. In this case, the number or cost of parts increases, and the likelihood of noise or abrasion increases. Accordingly, there is a need for a method capable of preventing noise or abrasion while reducing the number of parts or the cost required for providing the feeling of operation and the shift lock function.

SUMMARY

Aspects of the present disclosure provide a transmission for a vehicle that may prevent noise and/or abrasion from occurring while preventing the increase in the number of parts or the cost by allowing the shift to be controlled by a change of a magnetic field. However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a transmission for a vehicle may include a knob configured to be rotated to select one of a plurality of shift stages, a driving unit for controlling rotation of the knob based on a shift condition, and a shift controller for applying an electrical current to generate a torque in the driving unit for controlling the rotation of the knob. In particular, the driving unit may include a magnetic field generator, a magnetization unit including a plurality of magnetic bodies arranged at regular intervals along a circumference of the magnetic field generator, and a magnet unit including at least one pair of magnetic poles arranged along a circumference of the magnetization unit. One of the magnetization unit or the magnetization unit may be coupled with the knob and rotate integrally with the knob, and modes of operation of the driving unit may include a first mode that allows the rotation of the knob and a second mode that prevents the rotation of the knob depending on an intensity of a magnetic field generated by the magnetic field generator.

The torque in the second mode may be greater than the torque in the first mode. The magnetic field generator may comprise a core, a plurality of protrusions formed to protrude radially outward from the core along an outer circumference of the core, and a plurality of coils wound on each of the plurality of protrusions. The intensity of the magnetic field may be determined by at least one of a number of coils to which the electrical current is applied among the plurality of coils or an intensity of the applied electrical current.

The knob may allow the plurality of shift stages to be sequentially selected based on a direction of the rotation, and the plurality of magnetic bodies may be arranged at intervals corresponding to an angle at which the knob is rotated in order to select a next shift stage from a previous shift stage according to a selection order of the plurality of shift stages.

The second mode may have a greater number of coils to which the electrical current is applied than the first mode. Alternatively, the electrical current having an intensity greater than the electrical current of the first mode may be applied in the second mode while the electrical current is applied to a same number of coils in the second mode as in the first mode. The shift controller may cause the electrical current to be applied to at least one of the plurality of coils in the first mode and the second mode.

The modes of operation of the driving unit may further include a third mode in which the knob is rotated to a position corresponding to a predetermined shift stage in response to a return condition being satisfied. The plurality of coils may be divided into N groups including at least one coil, and the shift controller may cause N-phase currents having phase differences to be applied to each of the N groups in the third mode.

According to another aspect of the present disclosure, a transmission for a vehicle may include a knob configured to be rotated to select one of a plurality of shift stages, and a driving unit for controlling rotation of the knob. The driving unit may include a magnetic field generator, a magnetization unit including a plurality of magnetic bodies arranged at regular intervals along a circumference of the magnetic field generator, and a magnet unit including at least one pair of magnetic poles arranged along a circumference of the magnetization unit. In particular, the driving unit may generate a resistance force in a direction opposite to a direction in which the knob is rotated by an external force.

The resistance force may be generated by at least one of an attractive force or a repulsive force between at least one of the magnetization unit or the magnet unit and the magnetic field generator. A shift controller may be further included to allows an electrical current to be applied to the driving unit to generate the resistance force. The magnetic field generator may comprise a core, a plurality of protrusions formed to protrude radially outward from the core along an outer circumference of the core, and a plurality of coils wound on each of the plurality of protrusions. A magnitude of the resistance force may be determined by at least one of a number of coils to which the electrical current is applied by the shift controller among the plurality of coils or an intensity of the applied electrical current.

According to another aspect of the present disclosure, a transmission for a vehicle may include a knob configured to be rotated to select one of a plurality of shift stages, and a driving unit to generate a torque for controlling rotation of the knob. In particular, modes of operation of the driving unit may include a first mode in which a first torque is generated and a second mode in which a second torque greater than the first torque is generated.

The first mode may be a mode that allows the rotation of the knob, and the second mode may be a mode that prevents the rotation of the knob. The driving unit may comprise a magnetic field generator, a magnetization unit including a plurality of magnetic bodies arranged at regular intervals along a circumference of the magnetic field generator, and a magnet unit including at least one pair of magnetic poles arranged along a circumference of the magnetization unit. The driving unit may generate the torque based on at least one of an attractive force or a repulsive force between at least one of the magnetization unit or the magnet unit and the magnetic field generator. A shift controller may be further included to apply an electrical current to generate the torque in the driving unit. In particular, the driving unit may generate the torque that corresponds to an intensity of a magnetic field generated from the magnetic field generator depending on the electrical current applied by the shift controller.

According to another aspect of the present disclosure, a transmission for a vehicle may include a knob configured to be rotated to select one of a plurality of shift stages, a driving unit for controlling rotation of the knob, and a shift controller to apply an electrical current for controlling the rotation of the knob to the driving unit. In particular, modes of operation of the driving unit may include a first mode in which a first current is applied and a second mode in which a second current greater than the first current is applied. The first mode may be a mode that allows the rotation of the knob, and the second mode may be a mode that prevents the rotation of the knob. The driving unit may generate torques of different magnitudes depending on an intensity of the electrical current applied by the shift controller, and the torque in the second mode may be greater than the torque in the first mode.

A transmission for a vehicle according to the present disclosure has one or more of the following benefits. The rotation of a knob may be allowed or prevented depending on an intensity of a magnetic field generated when an electrical current is applied. Therefore, the number of parts and the cost may be reduced compared to using components that are in physical contact with each other. Further, noise and/or abrasion may be prevented or reduced.

The benefits of the present disclosure are not limited to the above-mentioned benefits, and other benefits not mentioned may be understood by a person skilled in the art.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some exemplary embodiments, well-known steps, structures and techniques will not be described in detail to avoid obscuring the disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, exemplary embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for explaining a transmission for a vehicle according to exemplary embodiments of the present disclosure.

Figure 1:
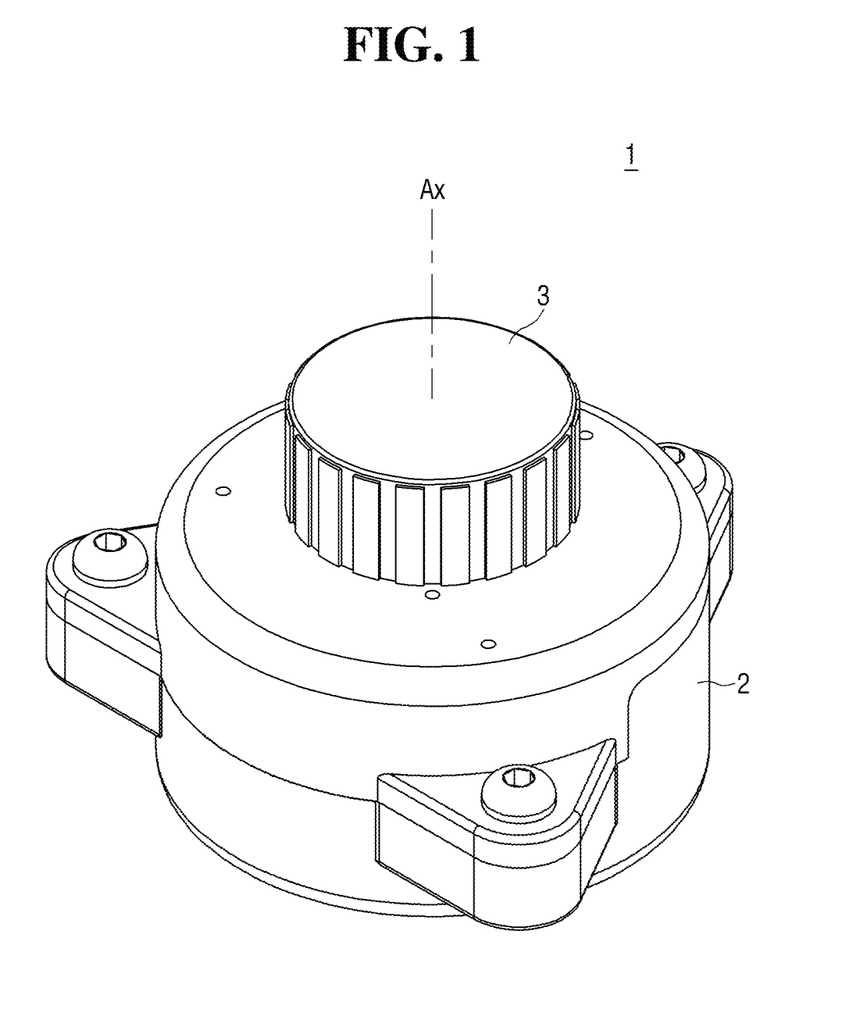
FIG. 1 is a perspective view of a transmission for a vehicle according to an exemplary embodiment of the present disclosure.

FIG. 1 is a perspective view of a transmission for a vehicle according to an exemplary embodiment of the present disclosure. Referring to FIG. 1, in the exemplary embodiment of the present disclosure, a transmission 1 for the vehicle may be a rotary type that is configured such that a knob 3 is exposed to one side of a housing 2 to allow a driver to hold the knob 3 and rotate around a rotation axis Ax to select a shift stage. However, the present disclosure is not limited thereto, and it may similarly be applied to a joystick type that allows the driver to select the shift stage by holding the knob (or a lever) and moving in a front-rear direction or left-right direction.

In the exemplary embodiment of the present disclosure, the shift stages selectable by the rotation of the knob 3 may be Park (P), Reverse (R), Neutral (N), and Drive (D) stages.

However, the present disclosure is not limited thereto, and the selectable shift stages may vary based on the design requirements and considerations. Depending on a rotation direction of the knob 3, the shift stage may be selected in the order of P, R, N, D stages or vice versa.

A position of the knob 3 may be determined by detecting a magnetic force that changes when the knob 3 is rotated due to a position change of a magnet provided in the knob 3 or a shaft coupled with the knob 3 when the knob 3 is rotated. A vehicle electronic control unit (ECU) may transmit a shift signal based on the determined position of the knob 3 to the transmission and thereby allow the shift stage to be selected.

In the exemplary embodiment of the present disclosure, the position of the knob 3 may be determined by change in the magnetic force of the magnet whose position changes when the knob 3 is rotated. However, the present disclosure is not limited thereto, and the position of the knob 3 may be determined by sensing the rotation direction or a rotation angle of the knob 3 in a contact or non-contact manner via a mechanical, electrical, magnetic, or optical sensor. The shift stages selectable by the rotation of the knob 3 are not limited to the P, R, N, and D stages. The shift stage selectable by the rotation of the knob 3 may be added, omitted, and changed. Some of the shift stages may be selected by an operation of a button or a switch provided separately.

The transmission 1 for the vehicle of the present disclosure may be disposed between a center fascia and a console box of most vehicles to enable easy shift operation by the driver. However, the position of the transmission 1 is not limited thereto, and the transmission 1 for the vehicle of the present disclosure may be disposed in various positions to ensure driver accessibility. In addition, in the transmission 1 for the vehicle of the present disclosure, the knob 3 may be exposed to an interior space of the vehicle while the housing 2 that accommodates various components necessary for performing a shift function or a shift lock function is disposed within a vehicle body without being exposed to the interior space, so that the interior space of the vehicle may be more efficiently utilized.

When the driver applies a force (or a torque) to the knob 3 to rotate the knob 3, the knob 3 may be allowed to rotate about the rotation axis Ax or blocked (e.g., prevented from rotating) based on a shift condition in order to prevent erroneous operation. Allowing the rotation of the knob 3 may include not only a situation where the knob 3 is rotated by the force applied by the driver, but also a situation where the knob 3 is rotatable without the force applied by the driver.

In the exemplary embodiment of the present disclosure, the rotation of the knob 3 may be allowed if particular shift conditions are satisfied, and the shift lock function is enabled to block the rotation of the knob 3 if the particular shift conditions are not satisfied. The shift conditions for each shift stage may be the same or may be different. For example, when a vehicle speed is at a threshold speed or below and the driver presses a brake pedal while a current shift stage is the P stage, the shift condition may be satisfied and the rotation of the knob 3 may be allowed so that the selection of a different shift stage is possible.

Generally, allowing or blocking the rotation of the knob 3 may be made by the interaction between the knob 3 and a plurality of gears that are directly or indirectly coupled. In this case, the number and cost of parts may increase due to the use of the plurality of gears. In addition, since the plurality of gears are physically engaged, the possibility of noise and/or abrasion is increased. Accordingly, in the exemplary embodiment of the present disclosure, instead of using the plurality of gears that are physically engaged with each other to allow or block the rotation of the knob 3, the rotation of the knob 3 may be allowed or blocked based on the change of magnetic field. Therefore, noise and/or abrasion may be prevented or reduced without increasing the number and cost of parts.

Figure 2:
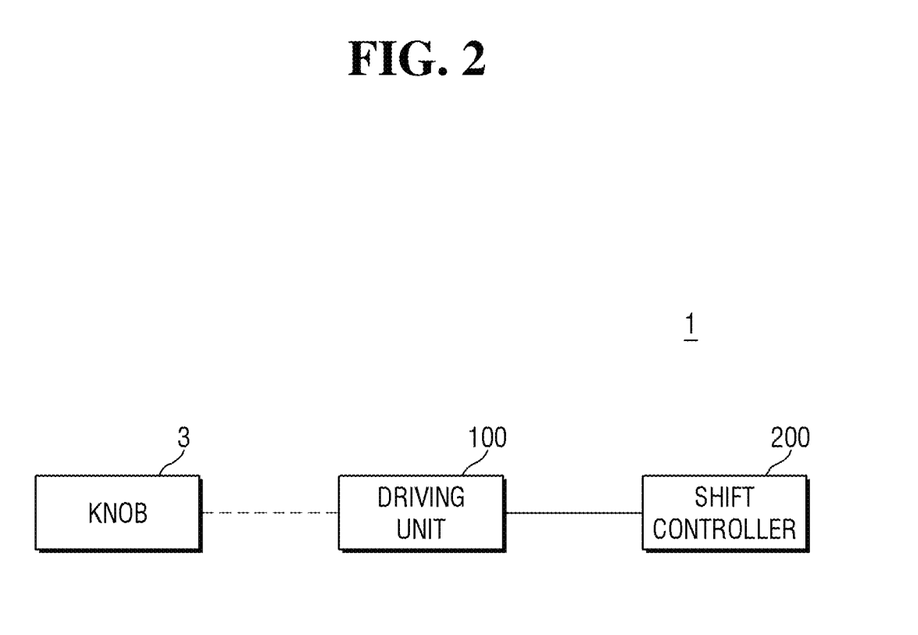
FIG. 2 is a block diagram showing the configuration of the transmission for the vehicle according to the exemplary embodiment of the present disclosure.

FIG. 2 is a block diagram showing the configuration of the transmission for the vehicle according to the exemplary embodiment of the present disclosure. Referring to FIG. 2, the transmission 1 for the vehicle according to the exemplary embodiment of the present disclosure may include a driving unit 100 and a shift controller 200. The driving unit 100 may control the rotation of the knob 3 by generating a torque for allowing or blocking the rotation of the knob 3 based on an electrical current applied by the shift controller 200.

The torque generated by the driving unit 100 may be applied in a direction opposite to a direction in which the driver rotates the knob 3 or in a direction in which the driver rotates the knob 3. It may be understood that when the torque generated by the driving unit 100 is applied in a direction in which the knob 3 is rotated by the driver, it means that a torque acting in a direction opposite to a direction in which the driver intends to rotate the knob 3 is decreased.

The shift controller 200 may apply an electrical current for generating a torque for the driving unit 100. The shift controller 200 may control a direct current or an alternating current to be applied to the driving unit 100 depending on an object to which a force for rotating the knob 3 is applied. For example, when the driver applies the force for rotating the knob 3, the shift controller 200 may allow the direct current to be applied to generate a resistance force that is exerted in the direction opposite to the rotation direction of the knob 3. When the knob 3 is automatically returned to a position corresponding to a predetermined shift stage, the shift controller 200 may apply the alternating current to generate a torque for rotating the knob 3. The detailed description thereof will be presented below.

Figure 3:
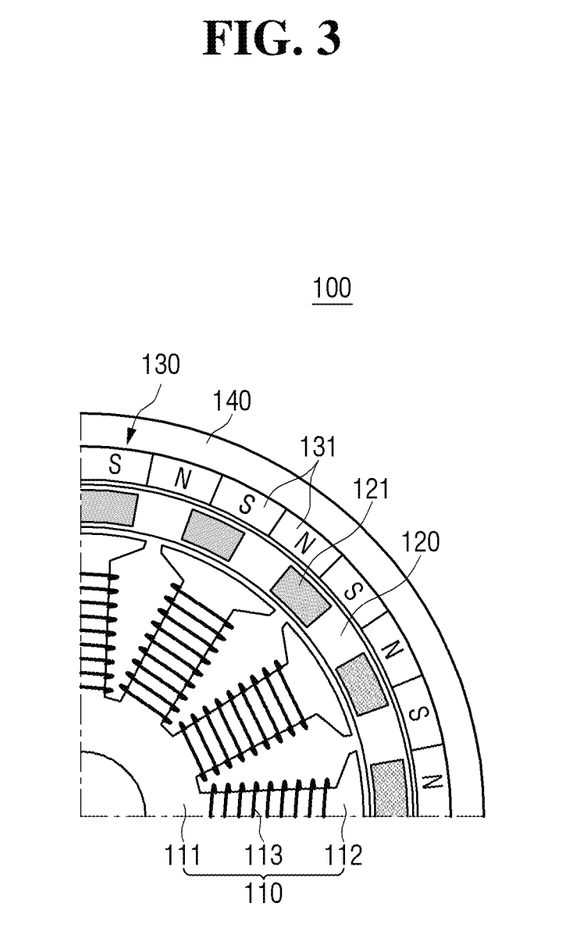
FIG. 3 is a schematic view showing a driving unit according to the exemplary embodiment of the present disclosure.

FIG. 3 is a schematic view showing a driving unit according to the exemplary embodiment of the present disclosure, and more particularly, showing a part of the driving unit 100. Referring to FIG. 3, the driving unit 100 according to the exemplary embodiment of the present disclosure may include a magnetic field generator 110, a magnetization unit 120, and a magnet unit 130. In the exemplary embodiment of the present disclosure, the magnetic field generator 110, the magnetization unit 120, and the magnet unit 130 may have a circular configuration around the rotation axis Ax of the knob 3.

The magnetic field generator 110 may include a core 111, a plurality of protrusions 112 formed to protrude outward (e.g., radially outward) from the core 111 along an outer circumference of the core 111, and a plurality of coils 113 wound on each of the plurality of protrusions 112. The magnetic field generator 110 may generate a magnetic field having an intensity corresponding to the number of coils to which a current is applied and/or the intensity of the applied current. In the exemplary embodiment of the present disclosure, it will be described as an example where the magnetic field generator 110 serves as a stator whose position is stationary.

Figure 4:
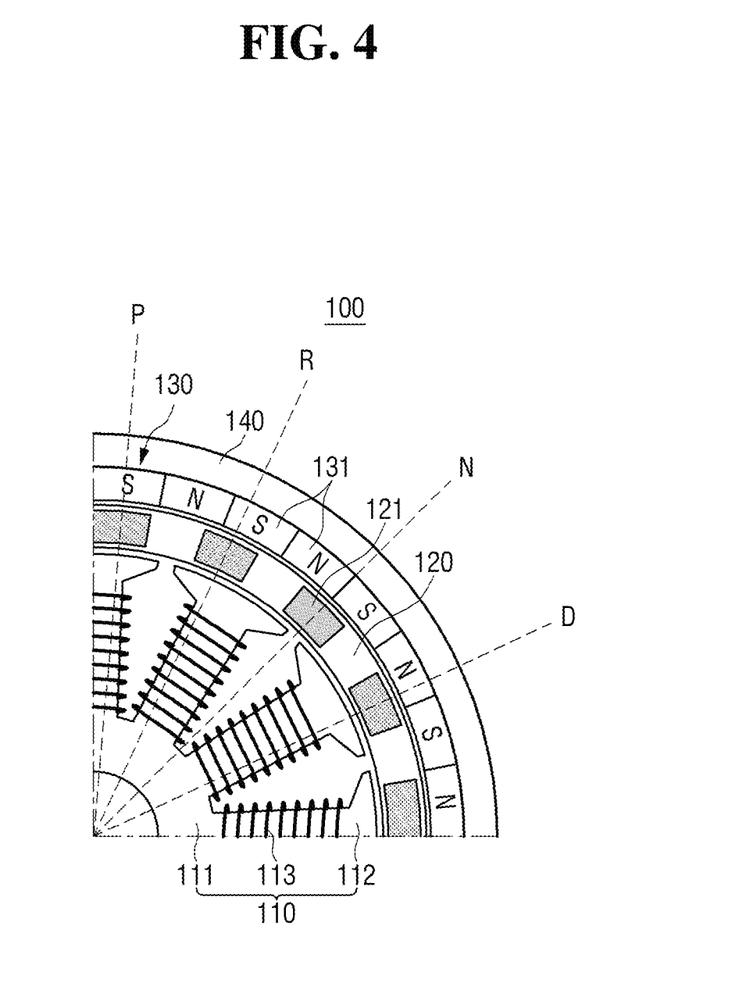
FIG. 4 is a schematic view showing a shift stage selectable by the rotation of a knob according to the exemplary embodiment of the present disclosure.

The magnetization unit 120 may be formed of a material having a high magnetic permeability, and may include a plurality of magnetic bodies 121 spaced apart at regular intervals along a circumference of the magnetic field generator 110. The plurality of magnetic bodies 121 may be spaced apart with an interval that corresponds to a rotation angle for selecting a next shift stage from a previous shift stage in the rotation direction of the knob 3. For example, when the shift stage is selected in the order of the P, R, N, D stages or the D, N, R, P stages depending on the rotation direction of the knob 3, the plurality of magnetic bodies 121 may be spaced apart to have an angle that corresponds to an angle at which the knob 3 is rotated to mutually select the P stage and the R stage, the R stage and the N stage, and the N stage and the D stage, respectively (hereinafter, referred to as a "unit rotation angle"), as shown in FIG. 4. Therefore, it may be understood that when the number of the magnetic bodies 121 is M, the unit rotation angle of the knob 3 is an angle obtained by dividing 360 degrees by M. The unit rotation angle of the knob 3 may vary depending on the number of the magnetic bodies 121.

For the magnet unit 130, at least one magnetic pole pair 131 including an N pole and an S pole may be arranged along the circumference of the magnetization unit 120. In the exemplary embodiment of the present disclosure, a plurality of magnetic pole pairs of the magnet unit 130 may be arranged on a inner surface of the core 140 that faces the magnetization unit 120 such that magnetic poles alternate. In other words, the magnet unit 130 may be arranged in the core 140 such that the magnetic poles alternate along the circumference of the magnetization unit 120 around the rotation axis Ax of the knob 3 in the order of N, S, N, S, and so on or S, N, S, N, and so on.

The driving unit 100 as described above may serve as a rotor in which either of the magnetization unit 120 and the magnet unit 130 is coupled with the knob 3 and rotated integrally. It may be understood that when either of the magnetization unit 120 and the magnet unit 130 is rotated integrally with the knob 3, it means that it is coupled and rotated so that there is no relative movement therebetween. In the exemplary embodiment of the present disclosure, it will be described as an example where the magnetization unit 120 serves as a rotor coupled with the knob 3. However, the present disclosure is not limited thereto, and either of the magnetization unit 120 and the magnet unit 130 may be coupled to rotate integrally with the knob 3 depending on the required intensity of torque.

A gear transmission ratio of the driving unit 100 may be determined depending on the number of protrusions 112 on which the coil 113 is wound and the total number of magnetic poles included in the magnet unit 130. Accordingly, a rotational speed of the knob 3 may be decreased or increased depending on to the gear transmission ratio of the driving unit 100.

In the transmission 1 for the vehicle of the present disclosure, an intensity of a resistance force acting in the direction opposite to the rotation direction of the knob 3 may be adjusted based on an intensity of the magnetic field generated by the magnetic field generator 110. The intensity of the magnetic field generated by the magnetic field generator 110 may be adjusted by the number of coils 113 to which an electrical current is applied and/or an intensity of an electrical current applied to the coil 113.

Figure 5:
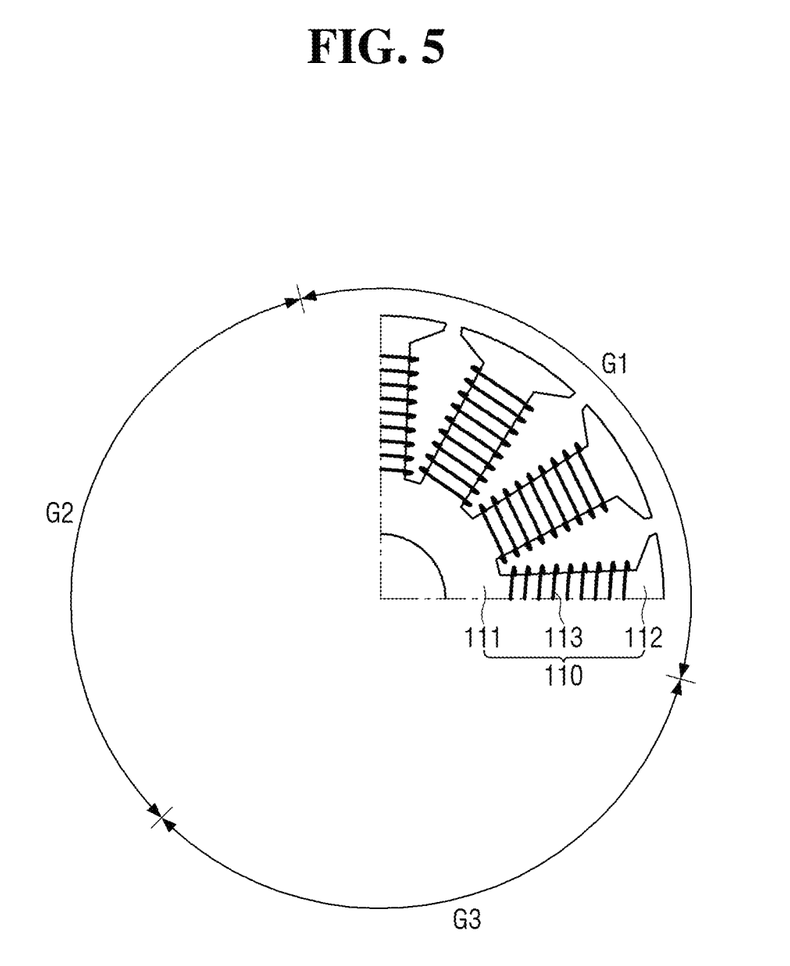
FIGS. 5 and 6 are schematic views showing a group to which a current is applied according to the exemplary embodiment of the present disclosure.

Hereinafter, in the exemplary embodiment of the present disclosure, it will be described as an example where the plurality of coils 113 are divided into a plurality of groups G1, G2, and G3 around the rotation axis Ax of the knob 3, and coils included in each group G1, G2, and G3 are electrically connected to each other. Accordingly, when a current is applied, a magnetic field is generated collectively, as shown in FIG. 5. In addition, in the exemplary embodiment of the present disclosure, the plurality of coils 113 may be divided into three groups G1, G2, and G3. However, the present disclosure is not limited thereto, and the number of groups may be variously adjusted depending on the required intensity of torque.

Figure 6:
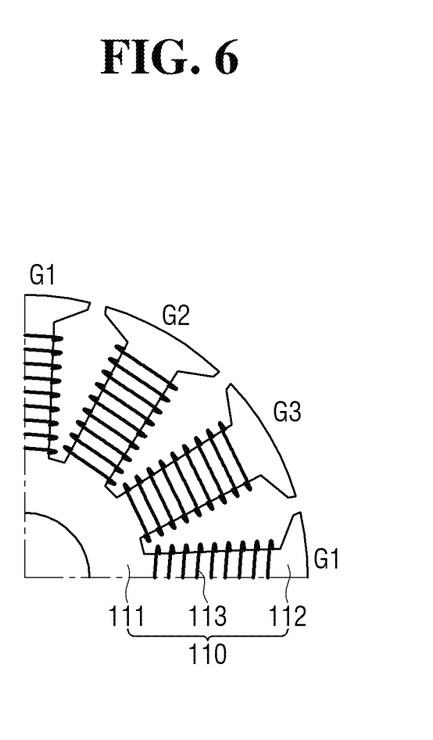

In FIG. 5 as described above, the coils included in each group G1, G2, and G3 may be sequentially disposed along a circumference of the core 111 of the magnetic field generator 110 described above. However, the present disclosure is not limited thereto, and the coils included in each group G1, G2, and G3 may be disposed to alternate with each other, as shown in FIG. 6. The number or position of the coils included in each group G1, G2, and G3 is not limited to configurations shown in FIGS. 5 and 6 as described above, and the number or position of the coils included in each group G1, G2, and G3 may be variously changed.

As the number of groups to which a current is applied among the three groups G1, G2, and G3 described above is increased, the intensity of the magnetic field generated from the magnetic field generator 110 may be increased. In this case, when a force is applied by the driver to rotate the knob 3, an intensity of a torque acting as a resistance force may be increased. Further, the magnetic field generator 110 may generate a magnetic field having a greater intensity when the intensity of the applied current is increased while the current is applied to the same number of groups. Also in this case, when the force is applied by the driver to rotate the knob 3, the intensity of the torque acting as the resistance force may be increased.

In the exemplary embodiment of the present disclosure, it will be described as an example where the intensity of the magnetic field is changed by changing the number of groups to which the current is applied or by changing the intensity of the current. However, the present disclosure is not limited thereto, and it is also possible to change the intensity of the magnetic field by changing both the group to which the current is applied and the intensity of the current.

Figure 7:
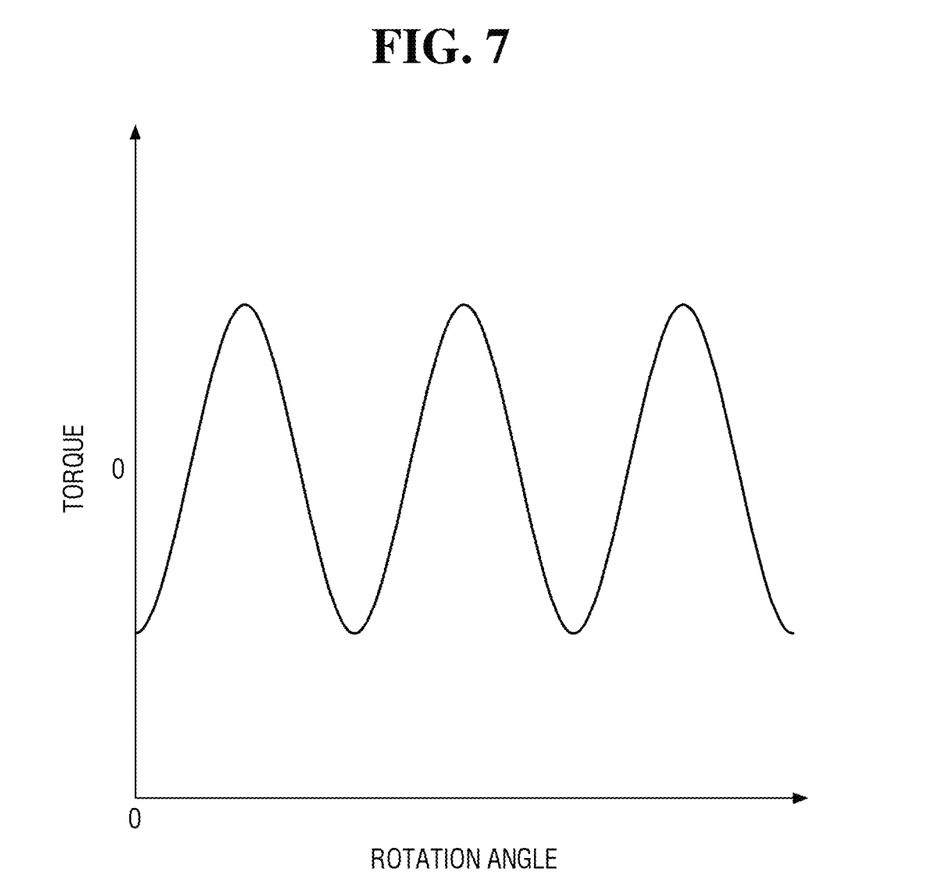
FIG. 7 is a schematic view showing a torque generated by a magnetic field generator in a first mode according to the exemplary embodiment of the present disclosure.

Here, when a magnetic field is generated by at least one of the three groups G1, G2, and G3 described above, at least a part of the plurality of magnetic bodies 121 may be magnetized by a group in which the magnetic field is generated. When the knob 3 is rotated by the force applied by the driver in this state, at least one of attractive or repulsive forces may act between the magnetized magnetic body and adjacent magnetic pole, thereby generating a sine wave-like torque profile as shown in FIG. 7. It may be understood that the torque of FIG. 7 is the intensity of the resistance force experienced by the driver when the driver rotates the knob 3. Since a magnitude of the resistance force experienced by the driver has a sine wave shape, a feeling of operation (e.g., tactile feedback or haptic feedback) may be provided to the driver.

Hereinafter, in the exemplary embodiment of the present disclosure, a mode in which the driving unit 100 operates to allow the rotation of the knob 3 will be referred to as a first mode, and a mode in which the driving unit 100 operates to block the rotation of the knob 3 will be referred to as a second mode.

The shift controller 200 may allow a direct current to be applied to at least one of the three groups G1, G2, and G3 in the first mode and the second mode, so that the magnetized magnetic body among the plurality of magnetic bodies 121 has a constant magnetic pole while the current is applied. Therefore, at least one of the attractive force or repulsive force may be periodically applied depending on the rotation of the knob 3, so that a torque in the form of a sine wave is generated. FIG. 7 described above is an example of a torque generated in the first mode allowing the rotation of the knob 3. It may be understood that when the driver rotates the knob 3, a sine wave torque is periodically generated for each unit rotation angle of the knob 3.

Therefore, initially, when the knob 3 remains stationary at a position corresponding to the P stage, unless a force greater than a threshold magnitude is applied by the driver, the magnitude of the resistance force becomes the greatest so that the knob 3 is prevented from rotating and no other shift stage is selected. Accordingly, the knob 3 may maintain the position corresponding to the P stage.

Here, in response to the driver applying a force of a predetermined magnitude or greater to the knob 3, the knob 3 may be rotated from the position corresponding to the P stage to a position corresponding to the R stage, and the driver may receive the feeling of operation due to the sine wave torque profile as shown in FIG. 7 described above.

In addition, when the knob 3 is rotated to the position corresponding to the R stage, the magnitude of the resistance force is the greatest, similar to the P stage described above, which maintains the knob 3 at the position corresponding to the R stage.

Therefore, compared to a case where a feeling of operation is provided as the knob 3 is rotated via a bullet that changes the position while being in contact with a detent groove, the increase in the number and cost of parts may be prevented, and noise and/or abrasion caused by physical contact between the bullet and the detent groove may be prevented or reduced.

Figure 8:
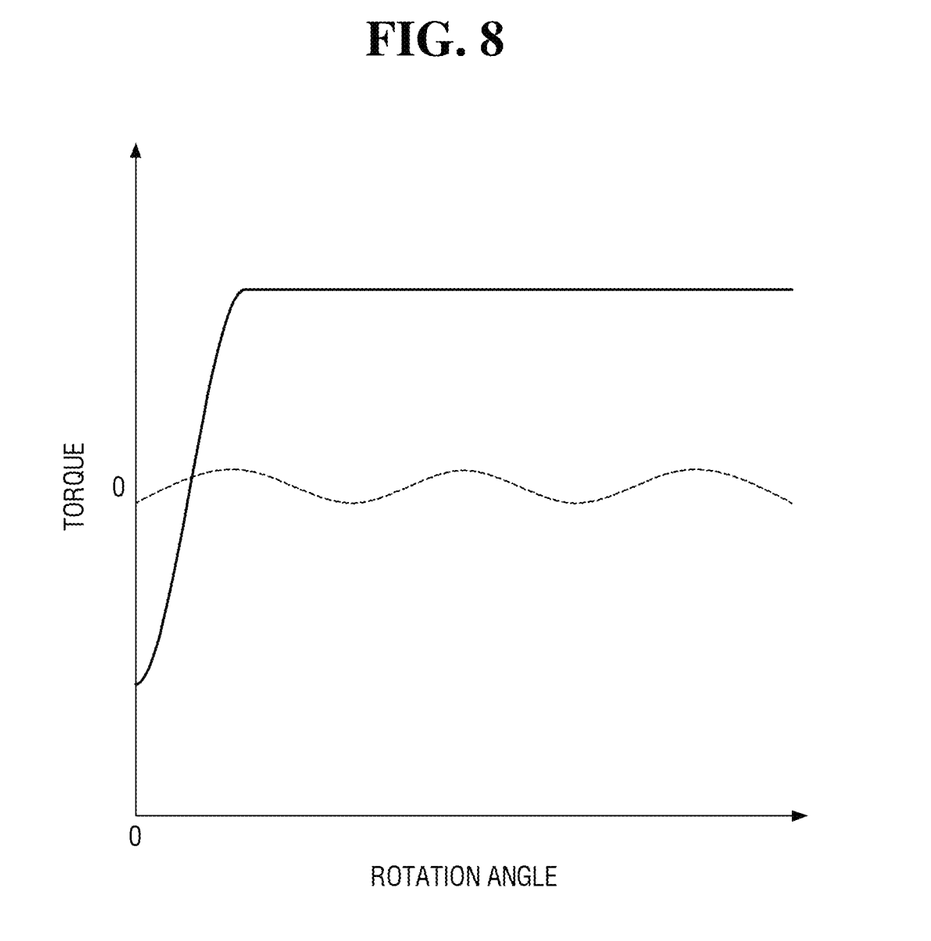
FIG. 8 is a schematic view showing a torque generated by the magnetic field generator in a second mode according to the exemplary embodiment of the present disclosure.

The second mode is a mode that prevents the driver from rotating the knob 3. In the second mode, as shown in FIG. 8, a torque with a relatively greater intensity is generated compared to a torque (dashed line) of the first mode. Therefore, although the driver applies a force to the knob 3, a resistance force may be exerted to prevent the knob 3 from rotating. It may be understood that the generation of a greater torque than the first mode in the second mode means that the intensity of the magnetic field generated by the magnetic field generator 110 is greater. For example, when a current is applied to one of the three groups G1, G2, and G3 in the first mode, it is possible to increase the intensity of the magnetic field by applying a current to two or more of the three groups G1, G2, and G3 in the second mode. On the other hand, when a current is applied to the same number of groups in the first mode and the second mode, the intensity of the magnetic field may be increased by increasing the current applied in the second mode.

In the transmission 1 for the vehicle of the present disclosure, when a return condition from a current shift stage to a preset shift stage is satisfied, a third mode for automatically returning to a position corresponding to the preset shift stage may be provided. For example, in the transmission 1 for the vehicle of the present disclosure, when the ignition of the vehicle is turned off at a non-parking stage or a separate operation is input from the driver, the knob 3 may be returned to a position corresponding to a parking stage.

Figure 9:
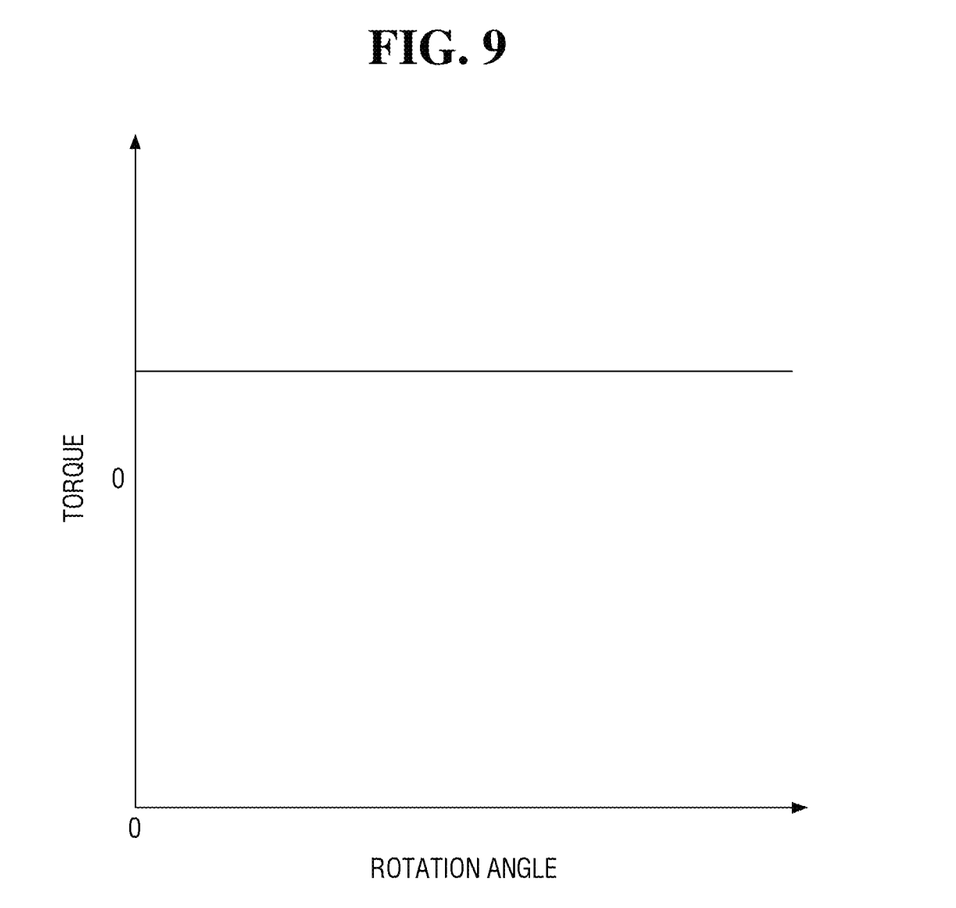
FIG. 9 is a schematic view showing a torque generated by the magnetic field generator in a third mode according to the exemplary embodiment of the present disclosure.

In the exemplary embodiment of the present disclosure, the plurality of coils 113 may be divided into the three groups G1, G2, and G3. As such, three-phase alternating current (e.g., U-phase, V-phase, and W-phase) may be applied from the shift controller 200 to the magnetic field generator 110. In this case, as shown in FIG. 9, the driving unit 100 may cause the magnetic field generator 100 to generate a rotating magnetic field so that a torque for returning the knob 3 to a position corresponding to the preset shift stage may be generated.

In the exemplary embodiment of the present disclosure, since the plurality of coils 113 are divided into the three groups G1, G2, and G3, an example is given for a case where the three-phase alternating current is applied to the magnetic field generator 110. However, the present disclosure is not limited thereto, and when the plurality of coils 113 are divided into N groups, N-phase alternating current may be applied. Further, in the exemplary embodiment of the present disclosure, it is described as an example where the knob 3 is rotated to return to the parking stage in the third mode. However, the present disclosure is not limited thereto, and when a shift condition is satisfied in an autonomous driving mode or the like, the knob 3 may be rotated to any position that corresponds to an appropriate shift stage. Generating a rotating magnetic field by a phase difference of alternating current applied to the magnetic field generator 110 to cause a rotor component (i.e., the magnetizing unit 120) to rotate is a known technique in the field. Therefore, the detailed description thereof will be omitted.

Figure 10:
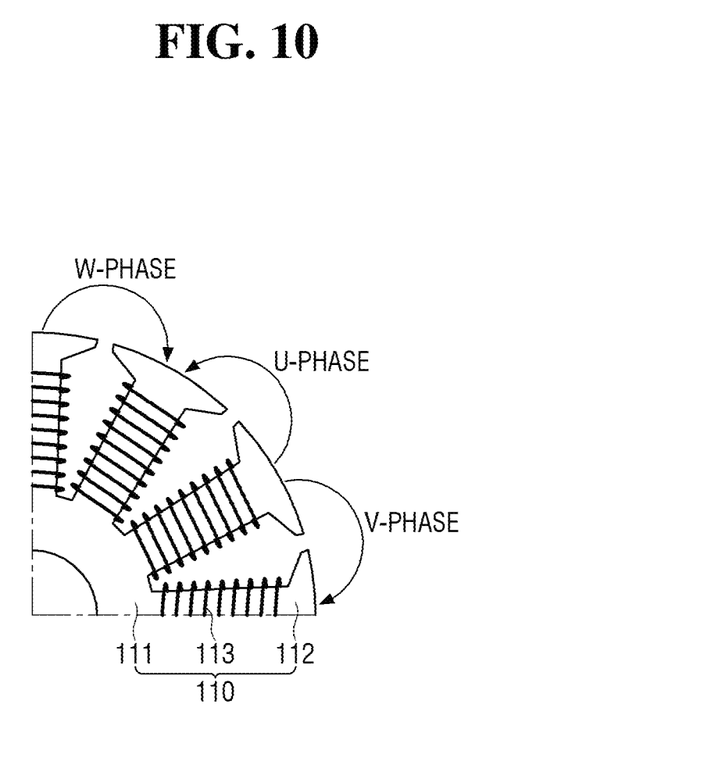
FIG. 10 is a schematic view showing a winding manner of a coil according to the exemplary embodiment of the present disclosure.

In the exemplary embodiment of the present disclosure, one of the N phases may be applied to the coil 113 wound on each of the plurality of protrusions 112. However, the present disclosure is not limited thereto, and it may be wound so that two or more phase currents of the N phases are applied to each of the plurality of protrusions 112. For example, as shown in FIG. 10, each of the plurality of protrusions 112 may be wound to allow two phase currents of the U phase, V phase, and W phase to be applied. However, this is an example to help understand the present disclosure. The present disclosure is not limited thereto, and a coil may be wound to allow two or more phase currents to be applied to each of the plurality of protrusions 112. An arrow in FIG. 10 is an example indicating a direction in which the U-phase, V-phase, and W-phase currents respectively flow. The direction in which each of the U-phase, V-phase, and W-phase currents flows or the number of coils may be varied.

As described above, in the transmission 1 for the vehicle of the present disclosure, instead of using a plurality of gears that are physically engaged with each other, the rotation of the knob 3 may be allowed or blocked, and the knob 3 may be returned to the preset shift stage in response to the change of the magnetic field. Therefore, the increase in the number or cost of parts may be prevented, and noise and/or abrasion may be prevented or reduced.

Further, in the transmission 1 for the vehicle of the present disclosure, the magnetic field generated from the magnetic field generator 110 may be adjusted by the current applied to the magnetic field generator 110 to adjust the generated torque. As a result, the torques of various intensities may be generated as required. Therefore, there is no need to manufacture separate transmissions depending to the required of torque, whereby the cost may be reduced.

In concluding the detailed description, those skilled in the art will appreciate that many variations and modifications can be made to the exemplary embodiments without substantially departing from the principles of the present disclosure. Therefore, the disclosed exemplary embodiments of the disclosure are used in a generic and descriptive sense only and not for purposes of limitation.

What is claimed is:

1. A transmission for a vehicle, comprising:
   a knob configured to be rotated to select one of a plurality of shift stages;
   a driving unit for controlling rotation of the knob based on a shift condition; and
   a shift controller for applying an electrical current to generate a torque in the driving unit for controlling the rotation of the knob,
   wherein the driving unit comprises: a magnetic field generator; a magnetization unit including a plurality of magnetic bodies arranged at regular intervals along a circumference of the magnetic field generator; and a magnet unit including at least one magnet with a pair of magnetic poles arranged along a circumference of the magnetization unit,
   wherein one of the magnetization unit or the magnet unit is coupled with the knob and rotates integrally with the knob,
   wherein modes of operation of the driving unit include a first mode that allows the rotation of the knob and a second mode that prevents the rotation of the knob, and
   wherein a present mode of operation is selected from the modes of operation depending on an intensity of a magnetic field generated by the magnetic field generator.

2. The transmission of claim 1, wherein the torque in the second mode is greater than the torque in the first mode.

3. The transmission of claim 1, wherein the magnetic field generator comprises: a core; a plurality of protrusions formed to protrude radially outward from the core along an outer circumference of the core; and a plurality of coils each being wound on each of the plurality of protrusions, and
   wherein the intensity of the magnetic field is determined by at least one of a number of coils to which the electrical current is applied among the plurality of coils or an intensity of the applied electrical current.

4. The transmission of claim 1, wherein the knob allows the plurality of shift stages to be sequentially selected based on a direction of the rotation, and
   wherein the plurality of magnetic bodies are arranged at intervals corresponding to an angle at which the knob is rotated in order to select a next shift stage from a previous shift stage according to a selection order of the plurality of shift stages.

5. The transmission of claim 1, wherein the second mode has a greater number of coils to which the electrical current is applied than the first mode.

6. The transmission of claim 1, wherein the electrical current having an intensity greater than the electrical current of the first mode is applied in the second mode while the electrical current is applied to a same number of coils in the second mode as in the first mode.

7. The transmission of claim 1, wherein the shift controller causes the electrical current to be applied to at least one of the plurality of coils in the first mode and the second mode.

8. The transmission of claim 1, wherein the modes of operation further include a third mode in which the knob is rotated to a position that corresponds to a predetermined shift stage in response to a return condition being satisfied.

9. The transmission of claim 8, wherein the plurality of coils are divided into N number of groups each including at least one coil, and
   wherein the shift controller causes one of N number of electrical currents having phase differences to be applied to each of the N number of groups in the third mode.

10. A transmission for a vehicle, comprising:
    a knob configured to be rotated to select one of a plurality of shift stages; and
    a driving unit for controlling rotation of the knob,
    wherein the driving unit comprises: a magnetic field generator; a magnetization unit including a plurality of magnetic bodies arranged at regular intervals along a circumference of the magnetic field generator; and a magnet unit including at least one magnet with a pair of magnetic poles arranged along a circumference of the magnetization unit, and
    wherein the driving unit generates a resistance force in a direction opposite to a direction in which the knob is rotated by an external force.

11. The transmission of claim 10, wherein the resistance force is generated by at least one of an attractive force or a repulsive force between at least one of the magnetization unit or the magnet unit and the magnetic field generator.

12. The transmission of claim 10, further comprising:
    a shift controller that allows an electrical current to be applied to the driving unit to generate the resistance force.

13. The transmission of claim 12, wherein the magnetic field generator comprises: a core; a plurality of protrusions formed to protrude radially outward from the core along an outer circumference of the core; and a plurality of coils each being wound on each of the plurality of protrusions, and
    wherein a magnitude of the resistance force is determined by at least one of a number of coils to which the electrical current is applied by the shift controller among the plurality of coils or an intensity of the applied electrical current.

14. A transmission for a vehicle, comprising:
    a knob configured to be rotated to select one of a plurality of shift stages; and
    a driving unit to control rotation of the knob, wherein modes of operation of the driving unit include a first mode and a second mode, wherein the driving unit generates a torque for controlling the rotation of the knob, wherein a first torque is generated in the first mode of the driving unit, and a second torque greater than the first torque is generated in the second mode of the driving unit, wherein the driving unit comprises:
- a magnetic field generator;
- a magnetization unit including a plurality of magnetic bodies arranged at regular intervals along a circumference of the magnetic field generator; and
- a magnet unit including at least one magnet with a pair of magnetic poles arranged along a circumference of the magnetization unit, and wherein the driving unit generates the torque based on at least one of an attractive force or a repulsive force between at least one of the magnetization unit or the magnet unit and the magnetic field generator.

15. The transmission of claim 14, wherein the first mode is a mode that allows the rotation of the knob, and wherein the second mode is a mode that prevents the rotation of the knob.

16. The transmission of claim 14, further comprising:
a shift controller for applying an electrical current to generate the torque in the driving unit, wherein the driving unit generates the torque that corresponds to an intensity of a magnetic field generated from the magnetic field generator depending on the electrical current applied by the shift controller.

17. The transmission of claim 14, further comprising:
a shift controller to apply an electrical current for controlling the rotation of the knob to the driving unit, wherein a first current is applied in the first mode of the driving unit, and a second current greater than the first current is applied in the second mode of the driving unit.

18. The transmission of claim 17, wherein the driving unit generates torques of different magnitudes depending on an intensity of the electrical current applied by the shift controller, and wherein the torque in the second mode is greater than the torque in the first mode.

* * * * *